United States Patent
Leuca et al.

(10) Patent No.: US 7,957,724 B2
(45) Date of Patent: *Jun. 7, 2011

(54) METHOD AND APPARATUS FOR INDICATING TO A WIRELESS NETWORK THE OPERATIONAL MODE OF A WIRELESS COMMUNICATOR

(75) Inventors: Ileana A. Leuca, Bellevue, WA (US); Michael Allen Raffel, Redmond, WA (US)

(73) Assignee: AT&T Mobility II LLC, Atlanta, GA (US)

(*) Notice: Subject to any disclaimer, the term of this patent is extended or adjusted under 35 U.S.C. 154(b) by 493 days.

This patent is subject to a terminal disclaimer.

(21) Appl. No.: 12/106,938

(22) Filed: Apr. 21, 2008

(65) Prior Publication Data

US 2008/0194245 A1 Aug. 14, 2008

Related U.S. Application Data

(63) Continuation of application No. 08/571,050, filed on Dec. 12, 1995, now Pat. No. 7,457,613.

(51) Int. Cl.
*H04Q 7/20* (2006.01)
(52) U.S. Cl. .......... 455/414.1; 455/418; 455/419; 455/422.1; 455/403; 455/414.4; 370/313; 370/310; 370/343; 379/88.13; 379/93.07; 379/100.16; 379/142.07
(58) Field of Classification Search ........... 455/414.1, 455/418, 419, 422.1, 403, 421, 424, 433, 455/435, 439, 466, 550.1, 552, 553, 31.2, 455/31.3, 426.1, 426.2, 451, 414.4, 500; 370/313, 310, 343; 379/88.13, 93.07, 100.16, 379/142.07, 210.01
See application file for complete search history.

(56) References Cited

U.S. PATENT DOCUMENTS

| | | | |
|---|---|---|---|
| 4,178,476 | A | 12/1979 | Frost |
| 4,590,473 | A | 5/1986 | Burke et al. |
| 4,672,657 | A | 6/1987 | Dershowitz |
| 4,748,655 | A | 5/1988 | Thrower et al. |
| 4,989,230 | A | 1/1991 | Gillig et al. |
| 5,117,449 | A | 5/1992 | Metroka et al. |
| 5,329,578 | A | 7/1994 | Brennan et al. |
| 5,379,339 | A | 1/1995 | Sakamoto |
| 5,432,839 | A | 7/1995 | Deluca |

(Continued)

FOREIGN PATENT DOCUMENTS

CA 1312367 1/1993

(Continued)

OTHER PUBLICATIONS

Regnier, J. and W.H. Cameron, Connecting the Future, San Diego, Dec. 2-5, 1990, vol. 1 of 3, Dec. 2, 1990, Institute of Electrical and Electronics Engineers, pp. 420-426.

(Continued)

*Primary Examiner* — Keith T Ferguson
(74) *Attorney, Agent, or Firm* — Moazzam & Associates, LLC

(57) ABSTRACT

A method for communicating on a wireless network includes receiving a mode signal from a network node. The mode signal represents an operational mode of the network node. The operational mode is defined by selecting from among a plurality of services at least one service whose reception over the wireless network is to be suspended or reinstated. Communication between the network node and the wireless network is subsequently conducted by taking into account the received mode signal. The network node may be a wireless communicator such as a cellular telephone or a fixed station device. Alternatively, the network node may be a wireless switch or a cellular base station.

13 Claims, 2 Drawing Sheets

U.S. PATENT DOCUMENTS

| | | | |
|---|---|---|---|
| 5,473,669 A | 12/1995 | Kanada et al. | |
| 5,566,181 A | 10/1996 | Huang et al. | |
| 5,574,977 A | 11/1996 | Joseph et al. | |
| 5,579,535 A | 11/1996 | Orlen | |
| 5,590,175 A | 12/1996 | Gallant et al. | |
| 5,590,406 A | 12/1996 | Bayley et al. | |
| 5,617,468 A | 4/1997 | Nojima et al. | |
| 5,742,905 A | 4/1998 | Pepe et al. | |
| 5,778,316 A | 7/1998 | Persson et al. | |
| 5,857,153 A | 1/1999 | Lupien | |
| 6,201,950 B1 | 3/2001 | Fuller et al. | |
| 6,212,372 B1 | 4/2001 | Julin | |
| 6,226,529 B1 | 5/2001 | Bruno et al. | |
| 6,826,400 B1 | 11/2004 | Cashman et al. | |

FOREIGN PATENT DOCUMENTS

| | | |
|---|---|---|
| DE | 4415734 | 5/1994 |

OTHER PUBLICATIONS

Brass et al., "Effects of Supplementary Services On The Signaling And Traffic Volume In A Mobile Radio Network," ISS '95: World Telecommunications Congress Advanced Switching v Technologies for University Telecommunication at the Beginning of the 21st Century Berlin, Apr. 23-28, 1995 p. 436-440.

Eleftheviadis, G.P. and M.E. Theologon, "User Profile Identification in Future Mobile Telecommunications Systems," IEEE Network: The Magazine Of Computer Communication, vol. 8, No. 5, Sep. 1994, pp. 33-39.

METHOD AND APPARATUS FOR INDICATING TO A WIRELESS NETWORK THE OPERATIONAL MODE OF A WIRELESS COMMUNICATOR

CROSS-REFERENCE TO RELATED APPLICATION

This application is a continuation of and claims the benefit of U.S. patent application Ser. No. 08/571,050, filed Dec. 12, 1995.

BACKGROUND OF THE INVENTION

Wireless communication networks can provide a variety of services such as voice and short message services. Short message services may include, for example, alphanumeric or numeric paging, notification services and information services. In certain circumstances it may be desirable to limit the number of services that a wireless communicator can receive during any given time period. For example, when the wireless communicator is registered onto a wireless network and receiving voice messages, it may be desirable to temporarily or permanently suspend any additional services that can be received over the network.

Methods are known in which a wireless subscriber can specify how individual calls are to be processed. For example, U.S. Pat. No. 5,329,578, entitled "Personal Communication Service With Mobility Manager," discloses a communications network that maintains a profile of each mobile telephone subscriber concerning, for example, how particular callers should be treated depending on their relative importance. Callers designated low priority may receive only a prerecorded announcement while a caller designated as highest priority may be immediately connected to the mobile subscriber. While this system allows the subscriber to attend to individual calls in a predetermined order of priority, it does not allow a subscriber to customize the various service or services to be received over the network for any desired period of time.

SUMMARY OF THE INVENTION

The present invention provides a method and apparatus for communicating on a wireless network. The invention allows a network node such as a wireless communicator to customize the service or services that it is to receive by transmitting a mode signal to the network indicating the service or services that are desired.

In accordance with the method of the invention, a mode signal is received from a network node. The mode signal represents an operational mode of the network node. The operational mode is defined by selecting from among a plurality of services at least one service whose reception over the wireless network is to be suspended or reinstated. Communication between the network node and the wireless network is subsequently conducted by taking into account the received mode signal.

The network node may be a wireless communicator such as a cellular telephone or a fixed station device. Alternatively, the network node may be a wireless switch or a cellular base station.

In one particular embodiment of the invention, a wireless communicator includes a transceiver, an antenna coupled to the transceiver, a microphone and speaker for providing an audio interface, and a user input for receiving user-initiated requests. The transceiver is controlled by a controller that is coupled to an operational mode selector. The operational mode selector defines an operational mode of the wireless communicator by selecting from among a plurality of services at least one service whose reception over a wireless network is to be suspended or reinstated. The transceiver is responsive to the mode selector such that the transceiver transmits a signal indicating the operational mode to the wireless network.

DETAILED DESCRIPTION

Figure 1:
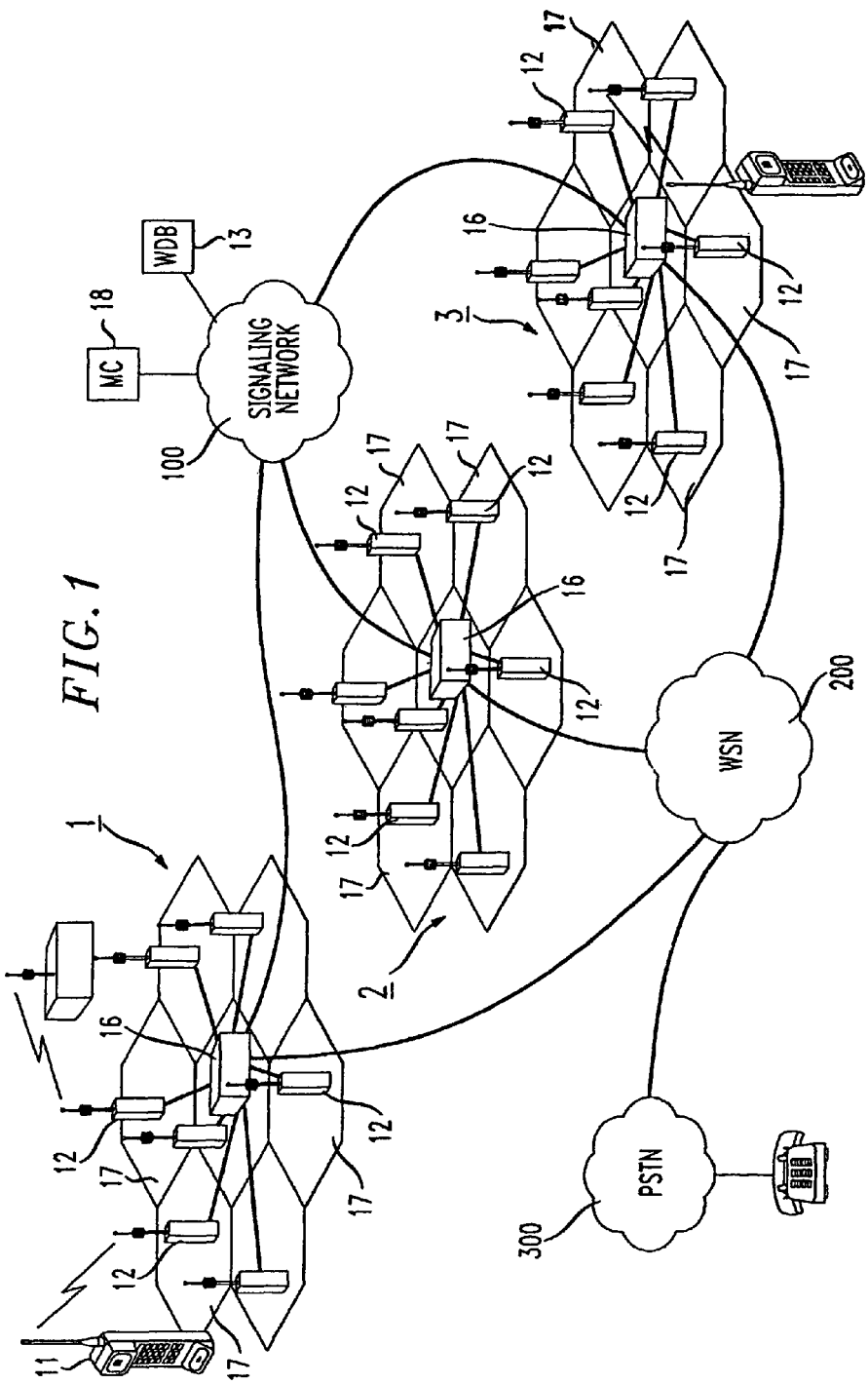
FIG. 1 shows a system diagram of a conventional wireless network.

FIG. 1 shows a system diagram of a conventional wireless network that serves radio service areas 1, 2, and 3. The radio service areas are interconnected via a signaling network 100 and a wireless switched network (WSN) 200. Signaling network 100 typically employs packet switching to achieve asynchronous communication and WSN 200 typically employs circuit switching to achieve asynchronous communication. The WSN 200 is interconnected with the public switched telephone network (PSTN) 300. Each radio service area is controlled by a voice or data wireless switch 16 that is surrounded by a plurality of cell sites 17. The wireless switches 16 are software-driven controlled switches that perform voice, data and signaling functions. Each cell site 17 is equipped with one or more base stations 12 that incorporate wireless transceivers.

In operation, a wireless communicator 11, if subscribed to the network, may establish RF communications with a cell site 17 via its respective base station 12. The wireless communicator 11 may be a mobile station such as a cellular telephone or a fixed station device such as a vending machine. The base station 12 in each cell site 17 is connected to the wireless switch 16 servicing its respective radio service area via dedicated facilities. The base stations 12 are interconnected via the signaling network 100 and the wireless switched network 200 so that wireless communicators in different service areas may communicate with one another. Wireless communicators also may communicate with landline systems via the WSN 200, which is connected to the PSTN 300.

A wireless data base 13 is associated with the signaling network 100. The wireless data base 13 maintains and updates subscriber information such as, but not limited to, identification numbers, authentication information, service features, service feature status, privileges, and restrictions. A variety of service provider gateways also may be associated with the signaling network 100 and the WSN 200. In the wireless network shown in FIG. 1, for example, a messaging center 18 providing short message service is associated with the signaling network 100. When a wireless communicator 11 is unavailable, the messaging center 18 may store for later forwarding any messages to be received by the communicator 11, including paging and electronic mail. A wireless communicator may be unavailable, for example, because: 1) it is not registered onto the wireless network; or 2) it is registered in an area where messaging capabilities are not available; or 3) the subscriber wishes to store all messages for subsequent retrieval; or 4) the communicator is not yet activated and over-the-air activation is required. The network node may include additional gateways for other service providers.

Additional details concerning the fixed and mobile hardware and software necessary to implement a wireless network are well known and hence will not be discussed further.

In accordance with one embodiment of the present invention, a signaling protocol is defined in which the wireless communicator 11 indicates its mode of operation to the wireless network. First, the operational mode of the wireless communicator 11 is defined by selecting from among a plurality of services at least one service whose reception over the wireless network is to be suspended or, alternatively, reinstated. Next, the cellular communicator 11 transmits a signal indicating the selected operational mode to the wireless network. The signal is received by the wireless database 13, which updates the status of the service features to be provided to the wireless communicator in accordance with the selected operational mode. The transmitted signal may indicate a change in the operational mode of the communicator 11 or it may simply confirm its current operational mode. In one embodiment of the invention, the wireless communicator 11 not only indicates its status, but additionally requests suspension or reinstatement of transmission of the selected service or services. The signal may also advise the network of the length of time that the communicator 11 will be unavailable to receive these services.

For example, if the wireless network provides only two services broadly classified as voice and short message service, the communicator can operate in one of the following four operational modes by notifying the appropriate service providers transmitting over the wireless network: 1) a universal mode (available for receiving both voice and short message services); 2) a messaging mode (available for receiving short message services only); 3) a voice-only mode (available for receiving voice only); and 4) a dormant mode (unavailable for receiving any services). This signaling protocol improves the efficiency of the wireless network since service providers will not needlessly transmit messages when the communicator is unavailable to receive those services. This protocol can also improve audio quality by allowing the user to prevent simultaneous transmission of voice and message data so that the available bandwidth does not need to be shared among the different services.

One of ordinary skill in the art will recognize that the signaling protocol defined by the present invention may be readily incorporated into any of the established digital cellular interface standards, including, but not limited to, EIA/TIA Standard 553, "Mobile Station-Land Station Compatibility Specification," September 1989, Electronic Industries Association, Washington, D.C.; EIA/TIA Interim standard IS-54-B, "Cellular System Dual-Mode Mobile Station-Basestation Compatibility Standard," April, 1992, Electronic Industries Association, Washington, D.C.; and EIA/TIA Interim Standard IS-136, "Cellular System Dual-Mode Mobile Station-Basestation; Digital Control Channel Compatibility Standard," April, 1995, Electronic Industries Association, Washington, D.C.

In the embodiment of the invention described above, the operational mode of a wireless communicator is communicated to the wireless network. In alternative embodiments of the invention, network nodes other than wireless communicators may indicate their modes of operation to the wireless network. Such network nodes include the wireless switches 16 and base stations 12 shown in the wireless network of FIG. 1. For example, a switch 16 servicing a particular radio service area may wish to limit the eligibility of some or all of the wireless communicators in that area to receive only selected services during periods of high congestion. The switch 16 may prevent all short messages from being communicated so that voice services can be received without conflict. Alternatively, the switch 16 may wish to indicate that only certain wireless communicators are eligible to receive short messages because the ineligible communicators subscribe to less expensive, lower priority service plans. The switch 16 may indicate that such eligibility extends for an indefinite duration or for a specifiable time period. In either case the switch 16 transmits a signal to the wireless data base 13 indicating its desired mode of operation.

Wireless switch 16 can also indicate that certain classes of communicators should be limited to selected services for a number of reasons. For example, using the short messaging service known as Cellemetery$^{SM}$ provided by Bell South, the switch 16 can indicate to the network that wireless communicators such as gas meters and vending machines only should be eligible to send or receive short messages indicating, respectively, the gas reading or conditions at the vending machine. Since these communicators can only operate in a messaging mode, potential fraud involving voice services can be avoided.

In general, the signal transmitted by a network node to the wireless network may include a variety of different information. In addition to informing the network of the particular service or services to be operational between the network node and the network, other information may include, for example, the duration of the specified operational mode, the directionality of each service (i.e., bi-directional or unidirectional communication), and whether any services that are currently ineligible to communicate with a network node should store any information that is received during the ineligibility period for later retrieval.

In another embodiment of the invention the operational mode of the network node is established by a service provider gateway or a wireless data base such as data base 13 shown in FIG. 1 rather than by the network node itself. For example, messaging center 18 shown in FIG. 1 can transmit a signal through the wireless network to a network node such as wireless communicator 11. This signal determines the eligibility of the communicator 11 to communicate with the messaging center 18. This capability advantageously allows a service provider gateway to control the eligibility of the communicator to receive the service. For example, in some circumstances it may be desirable to limit the services that can be received by wireless communicators such as the previously mentioned gas meter and vending machine.

Figure 2:
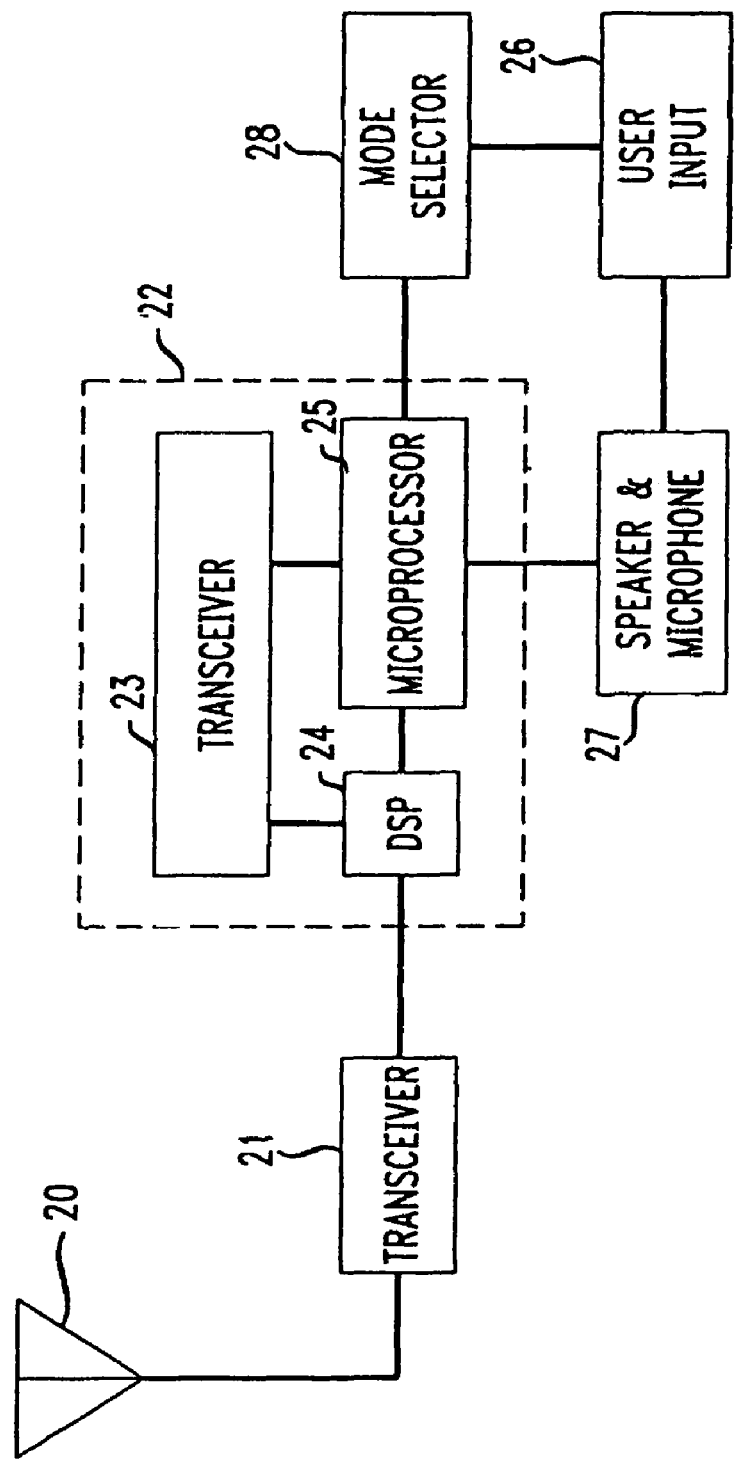
FIG. 2 shows a block diagram of a wireless communicator embodying the principles of the present invention.

FIG. 2 shows a block diagram of a wireless communicator embodying the present invention. The wireless communicator includes a transceiver 21, antenna 20, controller 22, a user input 26 such as a keypad, a speaker and microphone 27, and an operational mode selector 28. The controller 22 processes incoming and outgoing signals and includes a microprocessor 25, a digital signal processor 24 and a memory 23. The operational mode selector 28 allows the user to specify to the controller 22 the desired operational mode of the wireless communicator. The controller 22 in turn directs the transceiver 21 to transmit a signal to the wireless network indicating the selected operational mode.

The invention claimed is:

1. A method of communicating on a wireless network, the method comprising:

transmitting from a service provider gateway to a network node, a mode signal that establishes an operational mode of a class of wireless communicators, the operational mode determining eligibility of the class of wireless communicators to communicate with the service provider gateway, wherein the operational mode defines at least one service whose reception over the wireless network is to be suspended, or at least one suspended service that is to be reinstated; and conducting communication with the class of wireless communicators in accordance with the received mode signal.

2. The method of claim 1, wherein the service provider gateway is a messaging center or a wireless database.

3. The method of claim 1, wherein the network node is a wireless communicator.

4. The method of claim 1, wherein the network node is a wireless switch or a base station.

5. A method of updating a status of currently available services for a wireless communicator in a wireless network wherein the status of the currently available services is stored on the wireless network, comprising:

receiving a mode signal indicating an operational mode of the wireless communicator, the mode signal including a status of the wireless communicator and an indication of services to be suspended or reinstated for a class of wireless communicators; and if the wireless communicator belongs to the class of wireless communicators, updating the status of the currently available services for the wireless communicator to suspend services or reinstate services for the wireless communicator according to the mode signal.

6. The method of claim 5, wherein the mode signal further includes information associated with a duration of the operational mode or information associated with a directionality of each service.

7. The method of claim 5, wherein the mode signal further includes information associated with whether any services currently unavailable to communicate with the wireless communicator should store information received during an ineligibility period.

8. A method for communicating on a wireless network, the method comprising:

receiving a mode signal from one of a wireless switch and a base station registered on the wireless network, and capable of simultaneously handling data service and voice service, the mode signal representing a selected operational mode and an eligibility of certain wireless communicators to function in the selected operational mode, the selected operational mode being defined by selecting from the data service and the voice service at least one service whose reception over the wireless network is to be suspended or reinstated for the certain wireless communicators; and conducting communication with the certain wireless communicators by taking into account the received mode signal.

9. The method of claim 8, wherein the mode signal defines the operating mode of the certain wireless communicators by transmitting a signal to the wireless database indicating the desired mode of operation for the wireless communicators.

10. The method of claim 8, wherein the mode signal specifies a duration for a particular defined eligibility of the wireless communicators.

11. A method for communicating on a wireless network, the method comprising:

originating a mode signal from a network node that is a wireless switch or a base station;

sending the mode signal to the wireless network, the mode signal indicating a selected operational mode of a plurality of wireless communicators is to be suspended or reinstated, each of the wireless communicators in the plurality of wireless communicators being capable of communicating over the network via a data service and a voice service, the selected operational mode being at least one service selected from the data service and the voice service; and suspending or reinstating the selected operational mode of the plurality of wireless communicators based on receipt of the mode signal originated by the network node.

12. The method of claim 11, wherein the wireless network has a wireless database storing service status information, the method further comprising:

modifying service status information associated with the plurality of wireless communicators stored in the wireless database to indicate the selected operational mode of the plurality of wireless communicators has been suspended or reinstated.

13. The method of claim 11, wherein the mode signal indicates the selected operational mode of the plurality of wireless communicators is to be suspended or reinstated for a predetermined period of time.

* * * * *